United States Patent
Wang et al.

(10) Patent No.: US 8,934,184 B2
(45) Date of Patent: Jan. 13, 2015

(54) COLOR FILTER AND COLOR DISPLAY DEVICE USING SAME

(75) Inventors: Yi-Ching Wang, Hsinchu (TW); Lee-Tyng Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 141 days.

(21) Appl. No.: 13/407,861

(22) Filed: Feb. 29, 2012

(65) Prior Publication Data

US 2013/0003207 A1 Jan. 3, 2013

(30) Foreign Application Priority Data

Jul. 1, 2011 (TW) .............................. 100123362 A

(51) Int. Cl.
*G02B 5/22* (2006.01)
*G02B 5/20* (2006.01)
*G02F 1/1335* (2006.01)

(52) U.S. Cl.
CPC .......... *G02B 5/201* (2013.01); *G02F 1/133514* (2013.01); *G02F 2201/52* (2013.01)
USPC .............................. 359/891; 359/885; 359/892

(58) Field of Classification Search
None
See application file for complete search history.

(56) References Cited

U.S. PATENT DOCUMENTS

| | | | |
|---|---|---|---|
| 2005/0127819 A1 | 6/2005 | Ohtani | |
| 2008/0225213 A1* | 9/2008 | Park et al. | 349/106 |
| 2010/0284052 A1* | 11/2010 | Hsiao et al. | 359/259 |
| 2012/0147314 A1* | 6/2012 | Yoshizawa et al. | 349/144 |

FOREIGN PATENT DOCUMENTS

| | | |
|---|---|---|
| CN | 1539128 A | 10/2004 |
| CN | 1737650 A | 2/2006 |
| CN | 1928654 A | 3/2007 |
| CN | 1971365 A | 5/2007 |
| CN | 101405648 A | 4/2009 |
| CN | 201251665 Y | 6/2009 |
| CN | 101750791 A | 6/2010 |
| CN | 101881849 A | 11/2010 |
| CN | 102062971 A | 5/2011 |
| JP | 2007-27610 A | 2/2007 |
| JP | 2007178899 A | 7/2007 |
| JP | 2008-268738 A | 11/2008 |
| TW | 201040587 A | 11/2010 |
| WO | WO 2011024705 A1 * | 3/2011 |

OTHER PUBLICATIONS

Taiwan Patent Office, "Office Action", Jan. 8, 2014.
China Patent Office, "Office Action", Apr. 1, 2014.
China Patent Office, "Office Action", Aug. 26, 2014.

* cited by examiner

*Primary Examiner* — Jade R Chwasz
(74) *Attorney, Agent, or Firm* — WPAT, PC; Justin King

(57) ABSTRACT

A color filter includes a substrate and a plurality of pixel units. The substrate defines a plurality of pixel areas. Each pixel area has a plurality of first sub-pixel areas, and each first sub-pixel area has a first area and a second area. The pixel units are formed on the substrate corresponding to the pixel areas. Each pixel unit is disposed in a corresponding pixel area and includes a plurality of color subtractive filter films and a plurality of color additive filter films. The color subtractive filter films are disposed in the first areas of the first sub-pixel areas of the corresponding pixel area, and the color additive filter films are disposed in the second areas of the first sub-pixel areas of the corresponding pixel area. A color display device with the color filter is also disclosed.

12 Claims, 3 Drawing Sheets

COLOR FILTER AND COLOR DISPLAY DEVICE USING SAME

TECHNICAL FIELD

The present invention relates to color filters, and more particularly to a color filter suitable for use in a color display device.

BACKGROUND

With rapid development of technology, colorful and compact electronic products are becoming more and more popular to consumers. Color reflective displays are used in various compact products due to its excellent characteristic of utilizing an incident light which is reflected as light sources to display images.

At present, a color filter is an important component of a color reflective display for displaying color images. Referring to FIG. 1, a schematic view of a conventional color reflective display 100 is shown. The color reflective display 100 includes a color filter 102, a display medium layer 104 and an active element array substrate 106. The external light L at an outside of the color reflective display 100 passes through the color filter 102 and the display medium layer 104 in sequence, then is reflected back by the active element array substrate 106 to pass through the display medium layer 104 and the color filter 102, and finally enters into an user's eyes to obtain a colorful image. However, such configuration will decrease the overall light reflectivity and the light penetration rate of the color reflective display 100, thereby affecting the overall brightness of the color image.

Referring to FIG. 2, a plan view of a conventional color filter 200 is shown. The color filter 200 is mainly consisted of a substrate 202 and a plurality of pixel units 204 formed on the substrate 202. The pixel units 204 include a red filter film R, a green filter film G and a blue filter film B. In order to improve the light penetration rate of the color filter 200, the pixel units 204 further include a white filter film W, wherein the white filter film W can improve the brightness of light passing through the color filter 200. However, using a white filter film W cannot obtain a satisfactory effect for improvement of light brightness, and therefore this is not the efficient way to get a high light penetration rate.

SUMMARY

The present invention provides a color filter including a substrate and a plurality of pixel units. The substrate defines a plurality of pixel areas. The pixel units are formed on the substrate corresponding to the pixel areas. Each pixel unit is disposed in a corresponding pixel area and includes a plurality of color subtractive filter films and a color additive filter film.

The present invention provides a color display device including an active element array substrate, a color filter and a display medium layer disposed between the active element array substrate and the color filter. The color filter includes a substrate and a plurality of pixel units. The substrate defines a plurality of pixel areas. The pixel units are formed on the substrate corresponding to the pixel areas. Each pixel unit is disposed in a corresponding pixel area and includes a plurality of color subtractive filter films and a color additive filter film.

The present invention further provides a color filter including a substrate and a plurality of pixel units. The substrate defines a plurality of pixel areas. Each pixel area has a plurality of first sub-pixel areas, and each first sub-pixel area has a first area and a second area. The pixel units are formed on the substrate corresponding to the pixel areas. Each pixel unit is disposed in a corresponding pixel area and includes a plurality of color subtractive filter films and a plurality of color additive filter films. The color subtractive filter films are disposed in the first areas of the first sub-pixel areas of the corresponding pixel area, and the color additive filter films are disposed in the second areas of the first sub-pixel areas of the corresponding pixel area.

The present invention further provides a color display device including an active element array substrate, a color filter and a display medium layer disposed between the active element array substrate and the color filter. The color filter includes a substrate and a plurality of pixel units. The substrate defines a plurality of pixel areas. Each pixel area has a plurality of first sub-pixel areas, and each first sub-pixel area has a first area and a second area. The pixel units are formed on the substrate corresponding to the pixel areas. Each pixel unit is disposed in a corresponding pixel area and includes a plurality of color subtractive filter films and a plurality of color additive filter films. The color subtractive filter films are disposed in the first areas of the first sub-pixel areas of the corresponding pixel area, and the color additive filter films are disposed in the second areas of the first sub-pixel areas of the corresponding pixel area.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
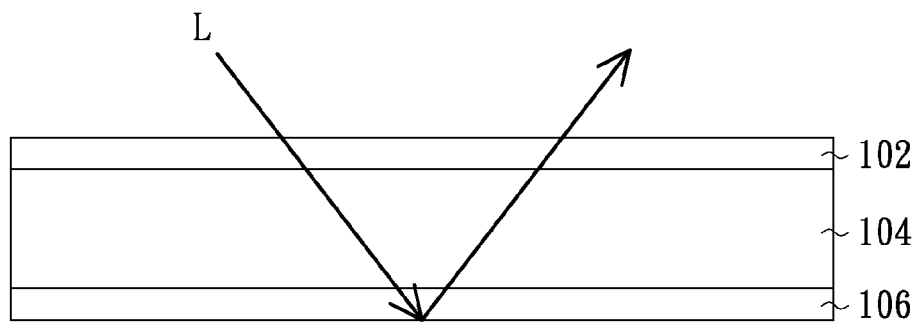
FIG. 1 is a schematic view of a color reflective display according to the related art.
Figure 2:
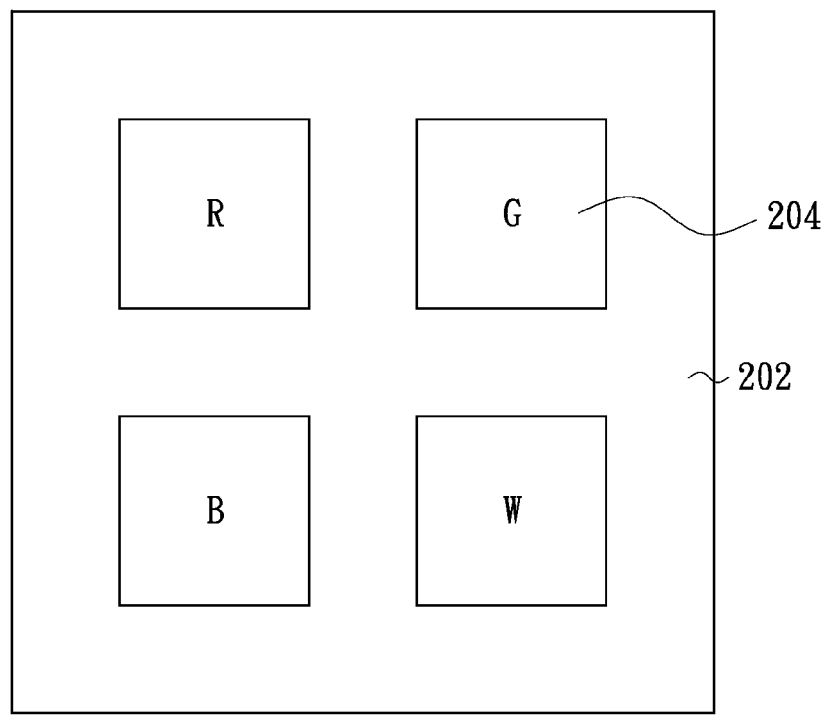
FIG. 2 is a plan view of a color filter according to the related art.
Figure 3:
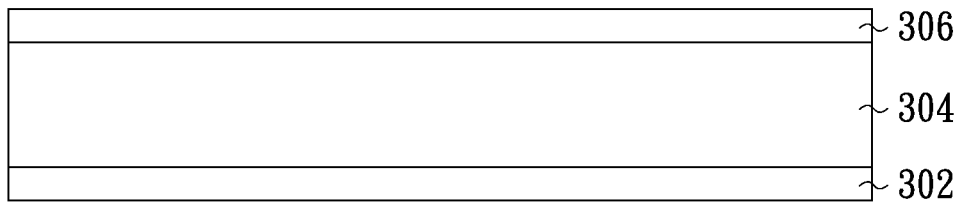
FIG. 3 is a schematic view of a color display device according to a first exemplary embodiment.

Referring to FIG. 3, a schematic view of a color display device 300, according to a first exemplary embodiment, is shown. The color display device 300 includes an active element array substrate 302, a color filter 306 and a display medium layer 304. The color filter 306 is disposed on the display medium layer 304. The display medium layer 304 is disposed on the active element array substrate 302, and the display medium layer 304 is disposed between the active element array substrate 302 and the color filter 306. In the present embodiment, the active element array substrate 302 is, for example, a thin film transistor (TFT) substrate. Furthermore, the display medium layer 304 can be, without limitation, a liquid crystal layer (LCL), an electro-phoretic layer (EPL), an electro-wetting layer (EWL) or an organic electro-luminescence layer (OELL).

Figure 4:
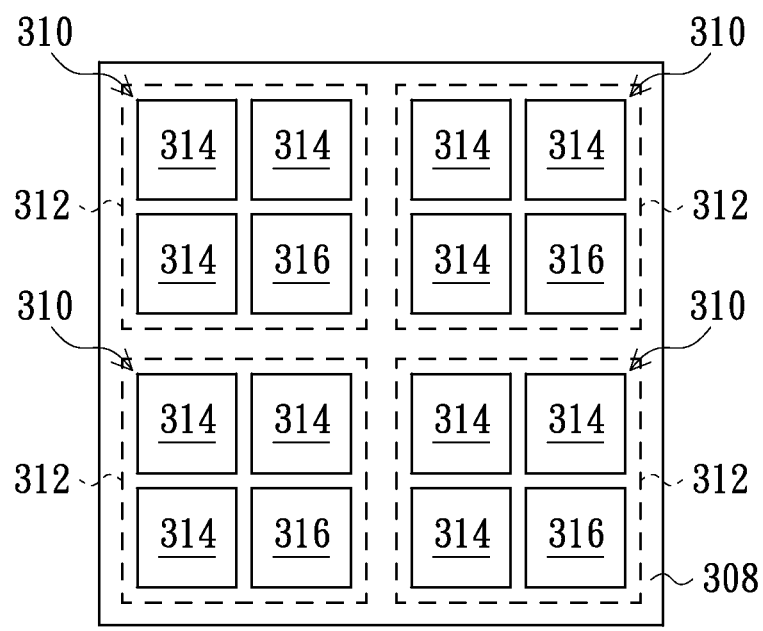
FIG. 4 is a schematic view of pixel units of a color filter of the color display device of FIG. 3.

Referring to FIG. 4, a schematic view of pixel units of the color filter 306 is shown. The color filter 306 includes a substrate 308 and a plurality of pixel units 310 on the substrate 308. The substrate 308 has a plurality of pixel areas 312 corresponding to the plurality of the pixel units 310. In FIG. 4, each pixel area 312 is substantially rectangular with a border thereof defined by dashed lines. Each pixel unit 310 is disposed in a corresponding one of the pixel areas 312 and includes a plurality of color subtractive filter films 314 and a color additive filter film 316.

In detail, the color subtractive filter films 314 disposed in each pixel area 312 may include a red filter film, a green filter film and a blue filter film, and the color additive filter film 316 disposed in each pixel area 312 can be selected from a magenta filter film, a cyan filter film or a yellow filter film. In a same pixel area 312, because the color additive filter film 316 is a mixture of two colors of the color subtractive filter films 314, the light penetration rate of the color filter 306 is effectively enhanced to improve the brightness and the saturation of the displayed image.

In addition, in order to improve the light reflectivity and the light penetration rate of the color display device 300 and to augment the color gamut of the displayed image simultaneously, a color filter described below can also be used in the color display device 300.

Figure 5:
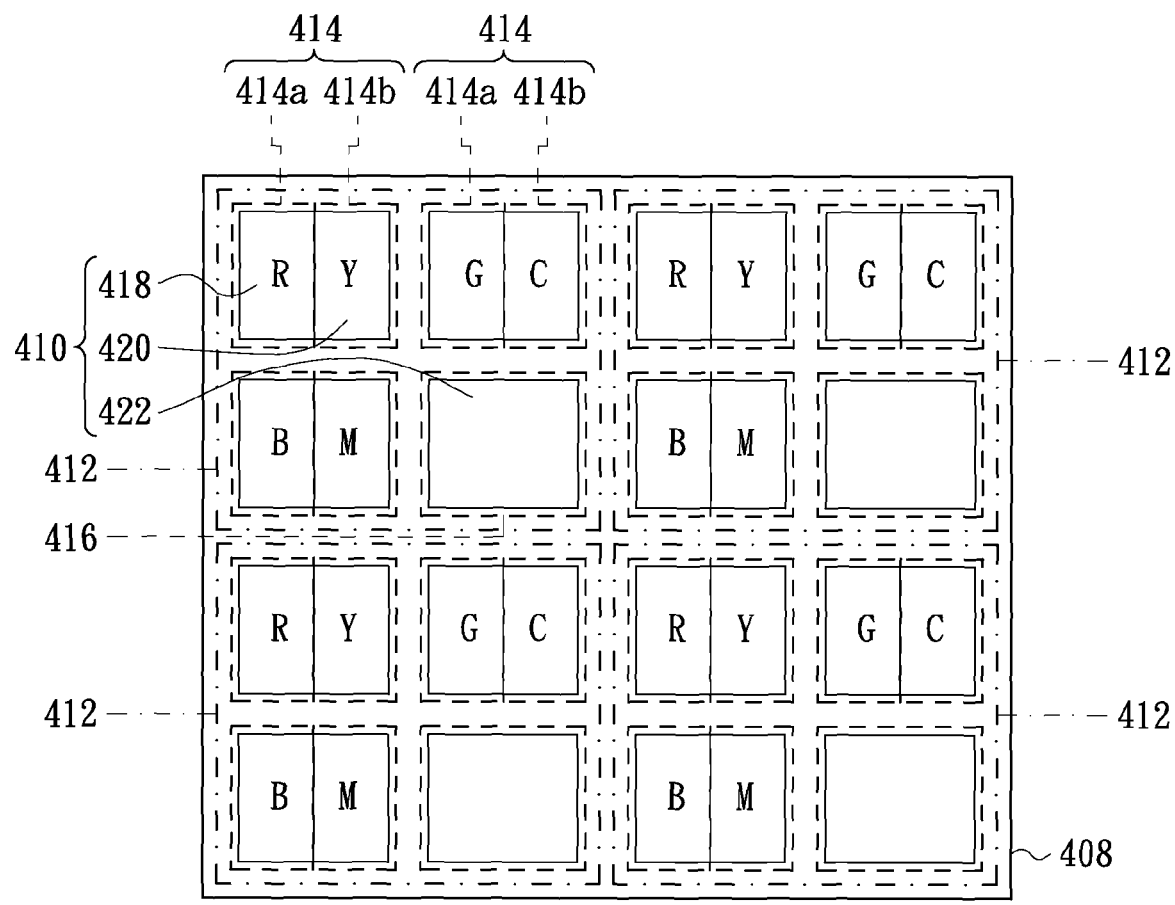
FIG. 5 is a schematic view of pixel units of a color filter according to a second exemplary embodiment.

Referring to FIG. 5, a schematic view of pixel units of a color filter 406, according to a second embodiment, is shown. The color filter 406 includes a substrate 408 and a plurality of pixel units 410 on the substrate 408. The substrate 408 defines a plurality of pixel areas 412 corresponding to the pixel units 410. Each pixel area 412 is further divided into a plurality of first sub-pixel areas 414. In the present embodiment, the shape of the first sub-pixel area 414 is square. In other embodiments, the shape of the first sub-pixel area 414 can be, without limitation, regularly polygonal, circular or irregularly polygonal. The first sub-pixel areas 414 each include a first area 414a and a second area 414b. In the present embodiment, the size of the first area 414a is equal to that of the second area 414b. In other embodiments, the size of the first area 414a can be larger than that of the second area 414b.

Each pixel unit 410 is disposed in a corresponding pixel area 412 and includes a plurality of color subtractive filter films 418 and a plurality of color additive filter films 420. The plurality of color subtractive filter films 418 may include a red filter film R, a green filter film G and a blue filter film B, while the plurality of color additive filter films 420 may include a magenta filter film M, a cyan filter film C and a yellow filter film Y. Meanwhile, the plurality of color subtractive filter films 418 are each disposed in a corresponding first area 414a of the first sub-pixel area 414, and the plurality of color additive filter films 420 are each disposed in a corresponding second area 414b of the first sub-pixel area 414.

In the present embodiment, the color subtractive filter film 418 and the color additive filter film 420 are respectively disposed in the first area 414a and the second area 414b of the first sub-pixel area 414. Specifically, the red filter film R and the yellow filter film Y are respectively disposed in the first area 414a and the second area 414b of one first sub-pixel area 414, thereby causing the lights passing through the red filter film R and the yellow filter film Y to mix and form an orange light. The color gamut of the orange light is determined by the area ratio of the red filter film R relative to the yellow filter film Y.

Simultaneously, the green filter film G and the cyan filter film C are respectively disposed in the first area 414a and the second area 414b of another first sub-pixel area 414. Thus, the lights passing through the green filter film G and the cyan filter film C are mixed and form a lame light. At the same time, the blue filter film B and the magenta filter film M are respectively disposed in the first area 414a and the second area 414b of a further first sub-pixel area 414, thereby causing the lights passing through the blue filter film B and the magenta filter film M to mix and form a purple light. The color gamut of the lame light is determined by the area ratio of the green filter film G relative to the cyan filter film C, while the color gamut of the purple light is determined by the area ratio of the blue filter film B relative to the magenta filter film M. Thus, the color gamut of the light after passing through the color filter 406 is determined by the area ratio of the first area 414a relative to the second area 414b.

In addition, in the present embodiment, each pixel area 412 can further include a second sub-pixel area 416, and the pixel unit 410 can further include a white filter film 422 disposed in the second sub-pixel area 416 to increase an intensity of the light passing through the color filter 406.

To sum up, in the above-illustrated color filters, the color subtractive filter film and the color additive filter film are disposed in a single pixel area, thereby not only increasing the light intensity of the color filter, but also maintaining the color gamut of the light passing through the color filter. In other words, such configuration of the color filter not only can improve the brightness of the color display device, but also can maintain the color gamut of the displayed images.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color filter comprising:
a substrate defining a plurality of pixel areas, each pixel area having a plurality of first sub-pixel areas, each first sub-pixel area having a first color area and a second color area, wherein said second color area is adjacent to and directly connected to the first color area, the first color area and the second color area being not overlapped with each other, and the first sub-pixel areas being not connected to each other; and
a plurality of pixel units formed on the substrate corresponding to the pixel areas, each pixel unit disposed in a corresponding pixel area and comprising a plurality of color subtractive filter films and a plurality of color additive filter films, wherein the color subtractive filter films are disposed in said first color areas of corresponding said first sub pixel area, the color additive filter films are disposed in said second color areas of corresponding said first sub pixel area, the color subtractive filter films comprise a red filter film, a green filter film and a blue filter film, and the color additive filter films comprise a magenta filter film, a cyan filter film and a yellow filter film.

2. The color filter according to claim 1, wherein the size of said first color area is not less than that of said second color area.

3. The color filter according to claim 1, wherein each pixel area further has a second sub-pixel unit further comprises a white filter film disposed in the second sub-pixel area.

4. The color filter according to claim 1, wherein a shape of the first sub-pixel area is selected from one of regularly polygonal, circular and irregularly polygonal.

5. The color filter according to claim 1, wherein the color subtractive filter films comprise a red filter film, a green filter film and a blue filter film, the color additive filter films comprise a magenta filter film, a cyan filter film and a yellow filter film, the red filter film and the yellow filter film are respectively disposed in the first color area and the second color area of one of the first sub-pixel areas, the green filter film and the cyan filter film are respectively disposed in the first color area and the second color area of another one of the first sub-pixel areas, and the blue filter film and the magenta filter film are respectively disposed in the first color area and the second color area of another one of the first sub-pixel areas.

6. The color filter according to claim 1, wherein the size of said first color area is larger than said second color area.

7. A color display device comprising:
an active element array substrate;
a color filter comprising:
a substrate defining a plurality of pixel areas, each pixel area having a plurality of first sub-pixel areas, each first sub-pixel area having a first color area and a second color area, wherein said second color area is adjacent to and directly connected to the first color area, the first color area and the second color area being not overlapped with each other, and the first sub-pixel areas being not connected to each other; and
a plurality of pixel units formed on the substrate corresponding to the pixel areas, each pixel unit disposed in a corresponding pixel area and comprising a plurality of color subtractive filter films and a plurality of color additive filter films, wherein the color subtractive filter films are disposed in said first color areas of corresponding said first sub pixel area, the color additive filter films are disposed in said second color areas of corresponding said first sub pixel area, the color subtractive filter films comprise a red filter film, a green filter film and a blue filter film, and the color additive filter films comprise a magenta filter film, a cyan filter film and a yellow filter film; and
a display medium layer disposed between the active element array substrate and the color filter.

8. The color display device according to claim 7, wherein the size of said first color area is not less than that of said second color area.

9. The color display device according to claim 7, wherein each pixel area further has a second sub-pixel area, and each pixel unit further comprises a white filter film disposed in the second sub-pixel area.

10. The color display device according to claim 7, wherein a shape of the first sub-pixel area is selected from one of regularly polygonal, circular and irregularly polygonal.

11. The color display device according to claim 7, wherein the color subtractive filter films comprise a red filter film, a green filter film and a blue filter film, the color additive filter films comprise a magenta filter film, a cyan filter film and a yellow filter film, the red filter film and the yellow filter film are respectively disposed in the first color area and the second color area of one of the first sub-pixel areas, the green filter film and the cyan filter film are respectively disposed in the first color area and the second color area of another one of the first sub-pixel areas, and the blue filter film and the magenta filter film are respectively disposed in the first color area and the second color area of another one of the first sub-pixel areas.

12. The color filter according to claim 7, wherein the size of said first area is larger said second area.

* * * * *